United States Patent
Ridderbusch

(10) Patent No.: US 8,707,921 B2
(45) Date of Patent: Apr. 29, 2014

(54) LASER DEVICE AND METHOD FOR OPERATING SAME

(75) Inventor: Heiko Ridderbusch, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 755 days.

(21) Appl. No.: 12/675,476

(22) PCT Filed: May 26, 2008

(86) PCT No.: PCT/EP2008/056397
§ 371 (c)(1),
(2), (4) Date: Oct. 14, 2010

(87) PCT Pub. No.: WO2009/030527
PCT Pub. Date: Mar. 12, 2009

(65) Prior Publication Data
US 2011/0017162 A1      Jan. 27, 2011

(30) Foreign Application Priority Data
Aug. 31, 2007    (DE) .................. 10 2007 041 529

(51) Int. Cl.
*F02P 23/04*    (2006.01)
*H01S 3/10*    (2006.01)
*F02B 19/00*    (2006.01)
*H01S 3/11*    (2006.01)
*H01S 3/113*    (2006.01)

(52) U.S. Cl.
USPC ............... 123/143 B; 372/10; 372/25; 372/70

(58) Field of Classification Search
USPC ........ 123/143 B; 372/10, 12, 25, 69, 70, 108, 372/109; 385/16, 31, 32, 50, 147
See application file for complete search history.

(56) References Cited

U.S. PATENT DOCUMENTS

| | | |
|---|---|---|
| 5,226,051 A | 7/1993 | Chan et al. |
| 7,810,462 B2 * | 10/2010 | Herden et al. ............ 123/143 B |
| 2010/0282195 A1 * | 11/2010 | Herden et al. ............ 123/143 B |
| 2011/0041793 A1 * | 2/2011 | Weinrotter et al. ........ 123/143 B |
| 2013/0276738 A1 * | 10/2013 | Hartke ...................... 123/143 B |

FOREIGN PATENT DOCUMENTS

| | | |
|---|---|---|
| EP | 0858138 | 8/1998 |
| JP | H60-18983 | 1/1985 |
| JP | 60-102785 | 6/1985 |
| JP | 63-191663 | 8/1988 |
| JP | 2002-503396 | 1/2002 |
| JP | 2002-270926 | 9/2002 |
| JP | 2004-289066 | 10/2004 |
| JP | 2008-064875 | 3/2008 |
| WO | WO 98/56088 | 12/1998 |
| WO | WO 2006/125685 | 11/2006 |

OTHER PUBLICATIONS

International Search Report, PCT International Patent Application No. PCT/EP2008/056397, dated Sep. 25, 2008.

* cited by examiner

*Primary Examiner* — Hieu T Vo
(74) *Attorney, Agent, or Firm* — Kenyon & Kenyon LLP

(57) ABSTRACT

A method for operating a laser device which has a laser-active solid and a preferably passive Q-switch in which the laser device is acted upon by pumped light for generating a laser pulse. The radiation spontaneously emitted by the laser device is analyzed for drawing a conclusion about an operating state of the laser device, in particular about a laser pulse being generated.

18 Claims, 2 Drawing Sheets

LASER DEVICE AND METHOD FOR OPERATING SAME

FIELD OF THE INVENTION

The present invention relates to a method for operating a laser device which has a laser-active solid and a preferably passive Q-switch in which the laser device is acted upon by pumped light for generating a laser pulse.

The present invention furthermore relates to a laser device having a laser-active solid and a preferably passive Q-switch; the laser device may be acted upon by pumped light for generating a laser pulse.

BACKGROUND INFORMATION

Methods and devices for operating a laser device are provided, among other things, for future use in ignition devices of internal combustion engines. To ensure reliable operation of the laser device, conventional operating methods provide for an optical signal corresponding to the generated laser pulse to be analyzed. This makes it possible, for example, to recognize a delayed occurrence of the laser pulse or even the absence of the laser pulse.

A disadvantage of the conventional methods and systems is the fact that an analysis of a possibly generated laser pulse requires an output mirror or another optical output device in a beam path of the laser device to allow a portion of the radiation intensity of the laser pulse required for the diagnosis to be supplied to a detector element, for example. Due to their location in the beam path of the conventional laser devices, the required output mirrors negatively affect the quality and, in particular, the optical efficiency of systems of this type and, in addition, complicate the design.

SUMMARY

An object of the present invention is to improve a laser device and a method of operation of the above-mentioned type in such a way that information is easily obtainable about an operating state of the laser device.

This object may be achieved according to an example embodiment of the present invention by analyzing the radiation spontaneously emitted by the laser device to draw a conclusion about an operating state of the laser device therefrom, in particular about a laser pulse being generated.

According to the present invention, the direct analysis of a radiation intensity of a laser pulse that might have been generated is avoided, so that the optical output devices and the like required in the conventional systems may be advantageously dispensed with. Instead, the example method according to the present invention provides for an analysis of the spontaneously emitted radiation of the laser device, also referred to in short as "spontaneous emission," as occurring, for example, when the laser device is acted upon by pumped light. According to the present invention, the spontaneously emitted radiation also contains information about the operation of the laser device and, accordingly, allows conclusions to be drawn about the operating behavior of the laser device.

In a particularly advantageous variant of the example operating method according to the present invention, it is provided that the laser device is excited at least longitudinally by the pumped light and that transversely emitted spontaneous radiation is analyzed. This may advantageously provide the possibility of obtaining information about an operating state of the laser device without having to place additional optical elements in a main beam path of the laser device. This results, in particular in no deterioration of the efficiency of the laser device as occurs in conventional systems having corresponding optical output devices.

According to another very advantageous variant of the operating method according to the present invention, it is provided that the variation of the intensity over time of the spontaneously emitted radiation is detected and analyzed, whereby a particularly accurate conclusion may be drawn about the operating behavior or an operating state of the laser device. The variation of the spontaneously emitted radiation over time, detected according to the present invention, may be analyzed in a conventional manner, for example, by differentiating or other suitable analytical methods.

In another very advantageous specific embodiment of the operating method according to the present invention it is provided that the spontaneously emitted radiation is analyzed as a function of a pumping start point in time at which the laser device starts being acted upon by the pumped light. This may advantageously ensure that a maximum amount of information about the operating state of the laser device according to the present invention may be recorded for the purpose of analysis. For example, it is convenient that the analysis according to the present invention is started directly at the pumping start point in time or delayed by a predefinable waiting time in relation thereto, whereby the amount of data to be processed may be reduced.

It is highly advantageously proposed in a further variant of the operating method according to the present invention that the analysis of the spontaneously emitted radiation includes detecting a maximum of the intensity of the spontaneously emitted radiation. It has been recognized according to the present invention that, when a laser pulse is generated in the laser device, there is a time correlation between the laser pulse actually being generated and a variation over time of the intensity of the spontaneously emitted radiation in such a way that the intensity of the spontaneously emitted radiation increases until the laser pulse is generated, and the intensity of the spontaneously emitted radiation decreases after or while the laser pulse is generated, since at this time a stimulated emission of photons is increasingly taking place, which accompanies the start of the laser operation and the laser pulse being generated.

A particularly efficient detection of the spontaneously emitted radiation analyzed according to the present invention makes it possible, pursuant to one example variant, that at least part of the spontaneously emitted radiation is detected with the aid of a detector situated in the area of the laser device, in particular of a photodiode.

Alternatively or additionally, it is furthermore possible that at least part of the spontaneously emitted radiation is transmitted from the laser device into a detector situated remotely from the laser device via an optical fiber device; also in this case, the detector may be a photodiode.

The radiation analyzed according to the present invention may be detected in a further variant of the present invention particularly efficiently by supplying the pumped light to the laser device via at least one first optical fiber of an optical fiber device having a plurality of optical fibers, and by transmitting at least part of the spontaneously emitted radiation from the laser device to a detector, in particular a photodiode, situated remotely from the laser device via at least one second optical fiber of the same optical fiber device.

Another highly advantageous variant of the operating method according to the present invention, in which a beam path of the laser device is also not affected, provides that at least part of the spontaneously emitted radiation is extracted from the laser device radially and injected into a section of the optical fiber device situated radially outside of the laser device.

In a highly advantageous specific embodiment of an example laser device according to the present invention, it is provided that an end section of a first optical fiber is situated for supplying the laser device with pumped light in such a way that the pumped light is injectable into the laser device at least longitudinally. Alternatively or additionally, it may be furthermore provided that a second optical fiber, associated with the same optical fiber device, is provided for transmitting at least part of the spontaneously emitted radiation from the laser device to a detector, in particular a photodiode, situated remotely from the laser device.

The example laser device according to the present invention and the example operating method according to the present invention provided therefore are particularly suitable for use in an ignition device of an internal combustion engine, for example, of a motor vehicle. The example laser device according to the present invention and the corresponding example operating method are also used in stationary engines or, in general, in other laser-based systems, in which obtaining information about an operating state of the laser device is important.

The use of the principle according to the present invention is not limited to passively Q-switched laser systems. Even in actively Q-switched laser systems, in which the point in time of generating a laser pulse is already known due to the required triggering of an active Q-switch, the example method according to the present invention may be used, for example, for diagnostic purposes or for a plausibility check of detected operating data.

Additional features, possible applications, and advantages of the present invention are derived from the following description of exemplary embodiments of the present invention, which are illustrated in the figures. All features described or illustrated by themselves or in any desired combination represent the subject matter of the present invention, regardless of their combination in the patent claims or their back-references, and regardless of their wording in the description or illustration in the figures.

DETAILED DESCRIPTION OF EXAMPLE EMBODIMENTS

Figure 1:
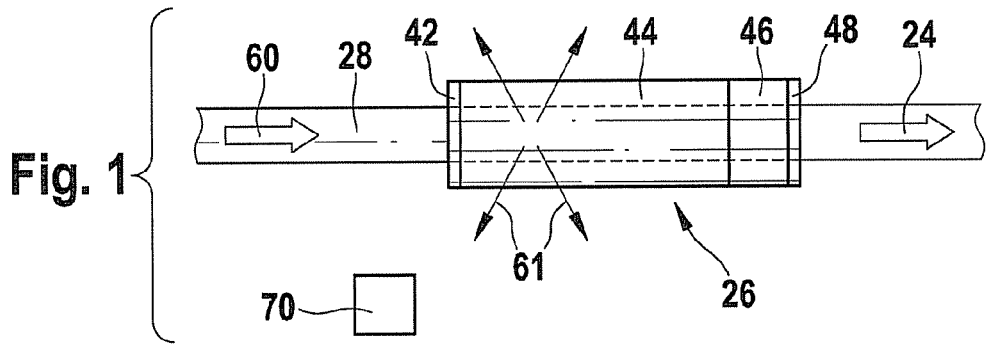
FIG. 1 shows a first specific embodiment of a laser device according to the present invention.

FIG. 1 schematically shows a detail view of a first specific embodiment of laser device 26 according to the present invention. Laser device 26 has a laser-active solid 44, with a passive Q-switch 46 situated optically downstream. Laser-active solid 44, together with passive Q-switch 46, and with input mirror 42 situated on its left in FIG. 1 and output mirror 48, forms a laser oscillator, whose oscillation behavior is a function of passive Q-switch 46 and thus is controllable at least indirectly.

In the configuration depicted in FIG. 1, laser device 26 according to the present invention, i.e., laser-active solid 44, is acted upon by pumped light 60 via input mirror 42, which excites electrons in laser-active solid 44 and thus causes a population inversion. Input mirror 42 has a relatively high transmission coefficient for the injected pumped light. Pumped light 60 is supplied to laser device 26, here via an optical fiber device 28.

While passive Q-switch 46 has its resting state, in which it has a relatively low transmission coefficient, laser operation in laser-active solid 44 or in solid 44, 46 delimited by input mirror 42 and output mirror 48 is avoided. With increasing pumping time, i.e., while laser oscillator 42, 44, 46, 48 continues to be acted upon by pumped light 60, the radiation intensity in the laser oscillator increases, so that passive Q-switch 46 finally fades out. This means that its transmission coefficient increases, and laser operation begins in laser oscillator 42, 44, 46, 48.

In the above-described way, a laser pulse 24, also referred to as giant pulse, is created, which has a relatively high peak power. Laser pulse 24 is then extracted from laser oscillator 42, 44, 46, 48 via output mirror 48 situated on the right in FIG. 1 and is usable, for example, in a laser-based ignition device for an internal combustion engine for igniting an air/fuel mixture in a combustion chamber of the internal combustion engine. For this purpose, laser pulse 24 may be injected into the combustion chamber of the internal combustion engine, for example, via an appropriate fiber optic device or directly via a combustion chamber window situated downstream from output mirror 48.

Instead of passive Q-switch 46, an active Q-switch (not shown) may also be used, which, however, requires a higher design complexity and more complicated triggering.

To monitor the operation of laser device 26 and, in particular, laser pulse 24 being generated, it is provided according to the present invention to detect and analyze radiation 61 spontaneously emitted by laser device 26 as it is generated when laser device 26, i.e., laser-active solid 44 contained therein, is acted upon by pumped light 60.

Figure 2:
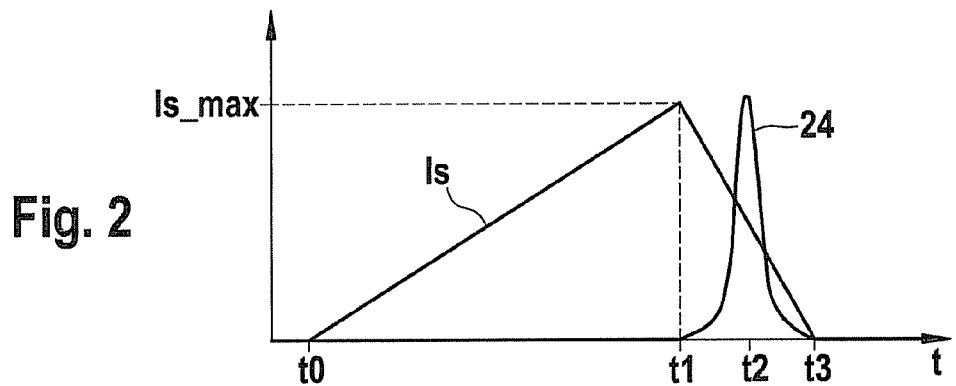
FIG. 2 shows the variation over time of an intensity of the radiation spontaneously emitted by the laser device according to FIG. 1, detected and analyzed according to the present invention.

FIG. 2 schematically shows a variation over time of intensity Is of radiation 61 spontaneously emitted by laser device 26 when acted upon by pumped light 60, and detected according to the present invention (FIG. 1). At point in time t0, laser device 26 starts to be acted upon by pumped light 60 (FIG. 1), so that an approximately linear increase of intensity Is of the spontaneously emitted radiation results. Starting at point in time t1, passive Q-switch 46 starts to fade, i.e., its transmission coefficient starts to decrease as described above, so that laser operation in the laser resonator formed by components 42, 44, 46, 48 may start accordingly. The stimulated emissions of photons occurring here result in that, starting at point in time t1, the variation over time of intensity Is of spontaneously emitted radiation 61 analyzed according to the present invention assumes a negative gradient. At point in time t2, laser pulse 24 is emitted by laser device 26, and intensity Is of spontaneously emitted radiation 61 is reduced as shown in FIG. 2 until point in time t3.

According to the present invention, variation over time Is of spontaneously emitted radiation 61 is detected and monitored in particular for the occurrence of local maximum Is_max at point in time t1.

Local maximum Is_max is characteristic for the start of the laser operation by laser device 26 and shows that a laser pulse 24 has actually been generated. Otherwise, i.e., as long as no laser pulse 24 is generated, for example, intensity Is of spontaneously emitted radiation 61, analyzed according to the present invention, would not drop to the degree illustrated in FIG. 2 until point in time t3. This means that from the occurrence of local maximum Is_max at point in time t1 and from the subsequent gradient of intensity Is the conclusion may be reliably drawn that laser pulse 24 has actually been generated.

Due to the fact that spontaneously emitted radiation 61, unlike the laser radiation emitted by stimulation, which corresponds to laser pulse 24, is emitted in all spatial directions, there is the advantageous possibility according to the example embodiment of the present invention of detecting spontaneously emitted radiation 61 in particular outside the main beam path of laser device 26, so that no additional optical elements are needed within the main beam path for extracting part of laser pulse 24, as is the case in the conventional systems.

For this purpose, FIG. 1 shows as an example a detector 70, which may be a photodiode, for example, situated radially outside laser device 26 for detecting spontaneously emitted radiation 61.

Figure 3:
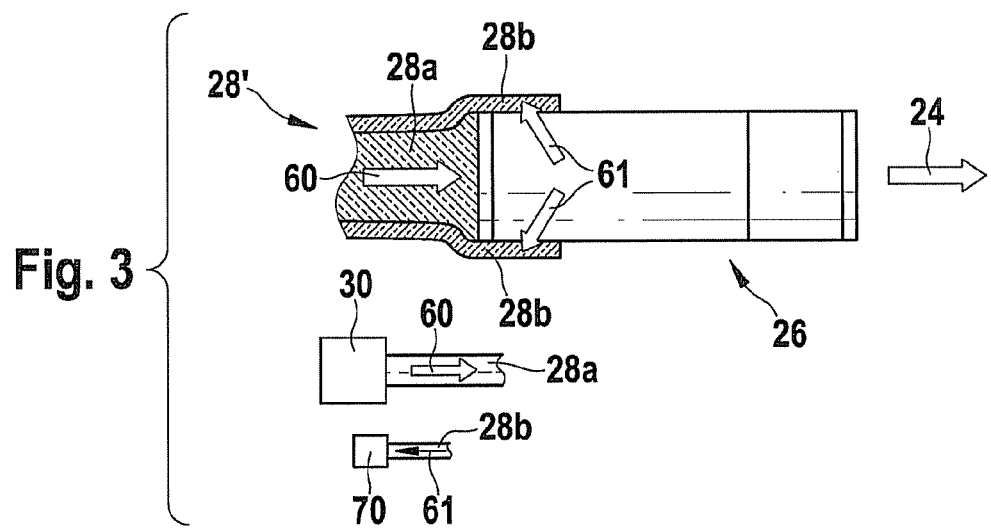
FIG. 3 shows another specific embodiment of the laser device according to present invention.

FIG. 3 shows another highly advantageous specific embodiment of laser device 26 according to the present invention.

Laser device 26 according to FIG. 3 has an optical fiber device 28', which has a plurality of individual optical fibers 28a, 28b. Optical fiber device 28' may therefore be advantageously used for simultaneously supplying laser device 26 with pumped light 60 and for transmitting spontaneously emitted radiation 61 detected and to be analyzed according to the present invention to a detector 70 situated remotely from laser device 26 due to the fact that first optical fiber 28a or an appropriate end section of first optical fiber 28a is situated opposite a front end of laser device 26, so that pumped light 60 may be injected directly into laser device 26 via the input mirror not shown in detail in FIG. 3.

In addition, second optical fiber 28b allows spontaneously emitted radiation 61 to be simultaneously extracted from laser device 26 and the extracted radiation to be transmitted to a remotely situated detector 70.

FIG. 3 shows, in addition to the components situated in the area of laser device 26, such as an end section of optical fiber device 28', pumped light source 30, situated remotely from laser device 26, which supplies first optical fiber 28a of optical fiber device 28' with pumped light 60. FIG. 3 also shows detector 70 situated remotely from laser device 26, to which spontaneously emitted radiation 61 is supplied via second optical fiber 28b of optical fiber device 28'.

The configuration according to the example embodiment of the present invention of optical fiber device 28' is particularly advantageous because it allows laser device 26 to be simultaneously supplied with pumped light 60 without substantial design complexity and, in addition, spontaneously emitted radiation 61 to be transmitted to detector 70. The above-described functionality may be advantageously achieved solely by assigning the corresponding individual optical fibers 28a, 28b of optical fiber device 28' to the particular areas of laser device 26.

Figure 4:
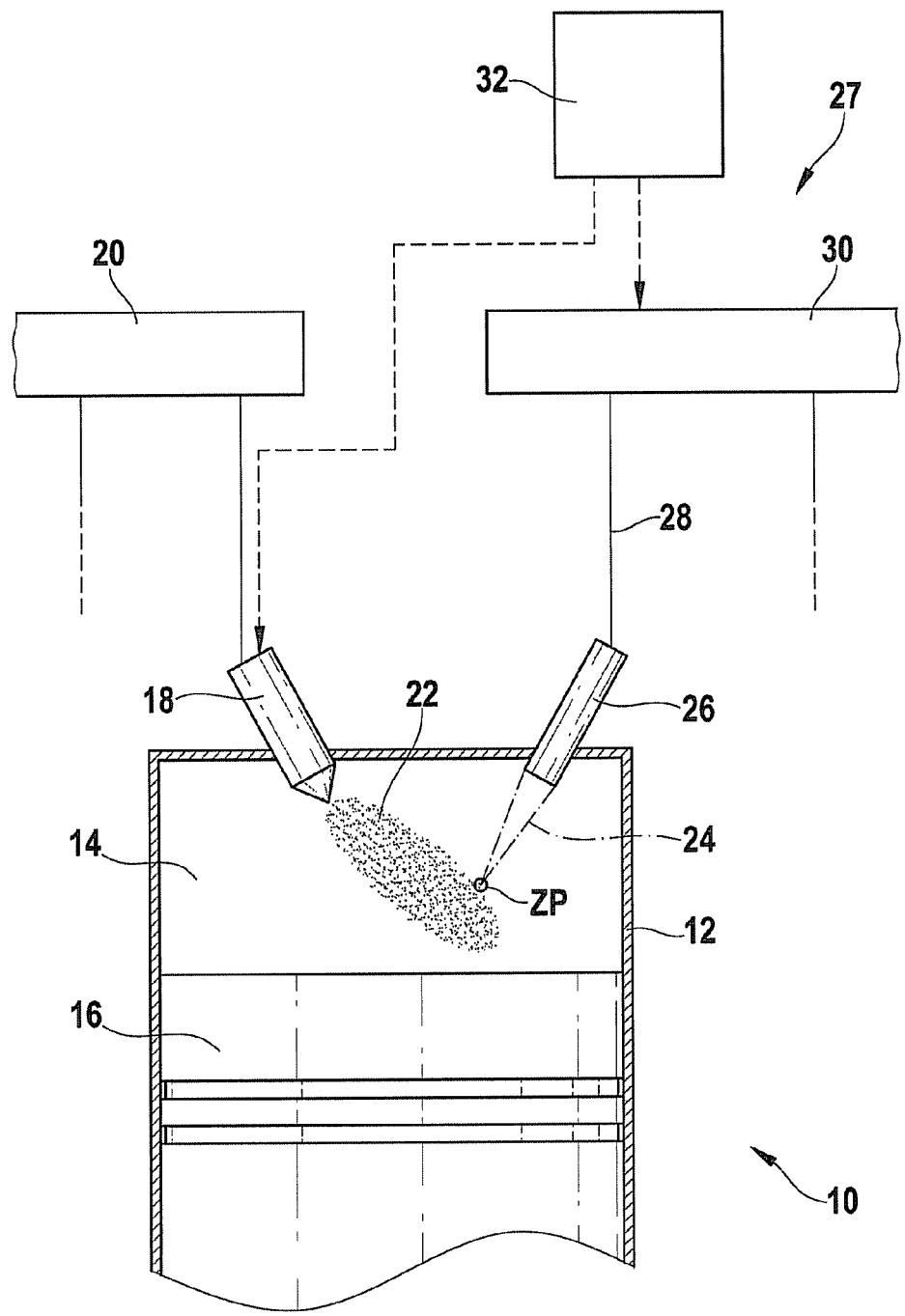
FIG. 4 shows a laser-based ignition system for an internal combustion engine having the laser device according to the present invention according to FIG. 1.

FIG. 4 shows another specific embodiment of the present invention in which laser device 26 according to the present invention is used in an ignition device 27 of an internal combustion engine 10 of a motor vehicle.

The internal combustion engine is labeled overall with reference numeral 10 in FIG. 4. It is used for driving a motor vehicle which is not illustrated. Internal combustion engine 10 includes a plurality of cylinders, only one of which is labeled with the reference numeral 12 in FIG. 4. A combustion chamber 14 of cylinder 12 is delimited by a piston 16. Fuel reaches combustion chamber 14 directly through an injector 18, which is connected to a pressurized fuel reservoir 20 known as rail.

Fuel 22 injected into combustion chamber 14 is ignited with the help of a laser beam, which is preferably beamed into combustion chamber 14 in the form of a laser pulse 24 by laser device 26 of ignition device 27 according to the present invention and is focused on ignition point ZP. For this purpose, laser device 26 is supplied, via optical fiber device 28, with pumped light 60 (FIG. 1) provided, in the case of ignition device 27, by a pumped light source 30 according to FIG. 4. Pumped light source 30 is controlled by a control unit 32, which also activates injector 18.

Detecting and analyzing radially extracted spontaneously emitted radiation 61 according to the present invention advantageously allows operating information of laser device 26 to be obtained in a reliable and flexible manner without impairing an optical efficiency of the system.

Laser device 26 having components 42, 44, 46, 48 preferably has a monolithic design, but may also be implemented as discrete units.

What is claimed is:

1. An ignition device for an internal combustion engine of a motor vehicle, comprising:
   at least one laser device including a laser-active solid and a Q-switch, the at least one laser device adapted to be acted upon by pumped light for generating a laser pulse, the at least one laser device further including a detector to detect a radiation spontaneously emitted by the laser device.

2. A laser device, comprising a laser-active solid and a Q-switch, the laser device adapted to be acted upon by pumped light for generating a laser pulse, the laser device including a detector to detect a radiation spontaneously emitted by the laser device.

3. The laser device as recited in claim 2, wherein the detector is situated radially outside with respect to the laser device.

4. The laser device as recited in claim 2, wherein the detector is a photodiode and is situated remotely from the laser device, and wherein the laser device further comprises an optical fiber device which is adapted to transmit at least part of the radiation spontaneously emitted by the laser device to the photodiode.

5. The laser device as recited in claim 4, wherein an injection section of the optical fiber device is situated radially outside on the laser device.

6. The laser device as recited in claim 4, wherein the optical fiber device has a plurality of optical fibers of which at least one first optical fiber is provided to supply the laser device with pumped light, and of which at least one second optical fiber is provided for transmitting at least part of the spontaneously emitted radiation from the laser device to the photodiode.

7. The laser device as recited in claim 6, wherein an end section of the first optical fiber is situated for supplying the laser device with pumped light, so that the pumped light is injectable into the laser device at least longitudinally.

8. A method for operating a laser device which has a laser-active solid and a Q-switch in which the laser device is acted upon by pumped light for generating a laser pulse, the method comprising:
   analyzing radiation spontaneously emitted by the laser device for drawing a conclusion about an operating state of the laser device.

9. The method as recited in claim 8, wherein the analyzing is for drawing a conclusion about a laser pulse being generated.

10. The method as recited in claim 8, further comprising: exciting the laser device at least longitudinally using pumped light, and analyzing transversely beamed spontaneously emitted radiation.

11. The method as recited in claim 8, wherein a variation over time of an intensity of the spontaneously emitted radiation is detected and analyzed.

12. The method as recited in claim 8, wherein the analyzing of the spontaneously emitted radiation is performed as a function of a pumping start point in time at which the laser device starts being acted upon by pumped light.

13. The method as recited in claim 8, wherein the analyzing of the spontaneously emitted radiation includes detecting a maximum of an intensity of the spontaneously emitted radiation.

14. The method as recited in claim 8, wherein at least part of the spontaneously emitted radiation is detected using a detector situated directly in an area of the laser device.

15. The method as recited in claim 14, wherein the detector is a photodiode.

16. The method as recited in claim 8, wherein at least part of the spontaneously emitted radiation is transmitted from the laser device situated remotely from the laser device via an optical fiber device.

17. The method as recited in claim 8, wherein pumped light is supplied to the laser device via at least one first optical fiber of an optical fiber device having a plurality of optical fibers, and at least part of the spontaneously emitted radiation is transmitted from the laser device to a photodiode situated remotely from the laser device via at least one second optical fiber of the same optical fiber device.

18. The method as recited in claim 17, wherein at least part of the spontaneously emitted radiation is radially extracted from the laser device and injected into a section of the optical fiber device situated radially outside of the laser device.

\* \* \* \* \*

UNITED STATES PATENT AND TRADEMARK OFFICE
CERTIFICATE OF CORRECTION

PATENT NO. : 8,707,921 B2 Page 1 of 1
APPLICATION NO. : 12/675476
DATED : April 29, 2014
INVENTOR(S) : Heiko Ridderbusch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this
Twenty-ninth Day of September, 2015

Michelle K. Lee
*Director of the United States Patent and Trademark Office*